United States Patent
Hildebrand et al.

[11] Patent Number: 5,905,478
[45] Date of Patent: May 18, 1999

[54] TWICE FOLDED COMPOUND MAGNIFIED VIRTUAL IMAGE ELECTRONIC DISPLAY

[75] Inventors: Alfred P. Hildebrand, Palo Alto; Gregory J. Kintz, Mountain View, both of Calif.

[73] Assignee: Siliscape, Inc., Sunnyvale, Calif.

[21] Appl. No.: 08/831,371

[22] Filed: Apr. 1, 1997

Related U.S. Application Data

[63] Continuation of application No. 08/441,529, May 15, 1995, Pat. No. 5,684,497, which is a continuation-in-part of application No. 08/407,102, Mar. 17, 1995, Pat. No. 5,625,372, which is a continuation-in-part of application No. 08/361,035, Dec. 21, 1994, Pat. No. 5,644,323.

[51] Int. Cl.$^6$ .................................................. G02B 27/10
[52] U.S. Cl. .............................. 345/8; 359/630; 359/631; 359/633; 348/53
[58] Field of Search ................................ 345/8; 359/630, 359/631, 633; 348/53

[56] References Cited

U.S. PATENT DOCUMENTS

| | | |
|---|---|---|
| 3,296,509 | 1/1967 | Katchman . |
| 3,758,196 | 9/1973 | Weiss . |
| 4,082,432 | 4/1978 | Kirschner . |
| 4,082,440 | 4/1978 | Bennett . |
| 4,099,831 | 7/1978 | Freeman . |
| 4,361,384 | 11/1982 | Bosserman . |
| 4,717,248 | 1/1988 | LaRussa . |
| 4,728,185 | 3/1988 | Thomas . |
| 4,832,427 | 5/1989 | Nanba et al. . |
| 4,859,031 | 8/1989 | Berman et al. . |
| 4,900,133 | 2/1990 | Berman . |
| 4,925,272 | 5/1990 | Ohshima et al. . |
| 4,969,730 | 11/1990 | van den Brandt . |
| 4,999,012 | 3/1991 | Suzuki et al. . |
| 5,035,474 | 7/1991 | Moss et al. . |
| 5,050,966 | 9/1991 | Berman . |
| 5,087,116 | 2/1992 | Taylor, II . |

(List continued on next page.)

FOREIGN PATENT DOCUMENTS

| | | |
|---|---|---|
| 0 566 000 A1 | 10/1993 | European Pat. Off. . |
| 0 566 001 A2 | 10/1993 | European Pat. Off. . |
| 0 566 002 A1 | 10/1993 | European Pat. Off. . |
| 2 004 383 | 3/1979 | United Kingdom . |

OTHER PUBLICATIONS

Handbook of Optics, vol. I, Fundamentals, Techniques, and Design, 2nd Edition, McGraw–Hill, Inc., 1.89; 32.10.

Handbook of Optics, vol. I, Fundamentals, Techniques and Design, 2nd Edition, McGraw–Hill, Inc., Chapt. 30.4, 30.5.

Frank L. Pedrotti, S.J., Introduction to Optics, Prentice Hall, pp. 50, 52–53, 140.

Frank L. Pedrotti, S.J., Introduction to Optics, Prentice Hall, pp. 137–138.

Frank L. Pedrotti, S.J., Introduction to Optics, Prentice Hall, pp. 522 and 528–530.

(List continued on next page.)

*Primary Examiner*—Chanh Nguyen
*Assistant Examiner*—Seth D. Vail
*Attorney, Agent, or Firm*—Wilson Sonsini Goodrich & Rosati

[57] ABSTRACT

A compact virtual image electronic display system is provided which includes a microdisplay for producing a source object, one or more magnification optics, and a distance adjusting mechanism for adjusting a distance between the one or more magnification optics and each other or a reflective surface, the magnification of the compound magnified image relative to the source object being dependent on this distance. The system may include a distance sensing mechanism for sensing the distance between the beamsplitting magnification optic and the reflective element and communicating the distance to a control mechanism which modifies the source object in response. The system can also include a control mechanism for causing the distance adjusting mechanism to adjust the distance in response to the source object produced by the microdisplay. The system can also include a user selectable input for modifying the source object.

20 Claims, 13 Drawing Sheets

5,905,478
Page 2

U.S. PATENT DOCUMENTS

| | | |
|---|---|---|
| 5,121,099 | 6/1992 | Hegg et al. . |
| 5,157,503 | 10/1992 | Dugdale . |
| 5,189,512 | 2/1993 | Cameron et al. . |
| 5,224,198 | 6/1993 | Jachimowicz et al. . |
| 5,291,338 | 3/1994 | Bezard et al. . |
| 5,303,085 | 4/1994 | Rallison . |
| 5,305,124 | 4/1994 | Chern et al. . |
| 5,323,477 | 6/1994 | Lebby et al. . |
| 5,334,991 | 8/1994 | Wells et al. . |
| 5,351,151 | 9/1994 | Levy . |
| 5,357,372 | 10/1994 | Chen et al. . |
| 5,361,165 | 11/1994 | Stringfellow et al. . |
| 5,369,415 | 11/1994 | Richard et al. . |
| 5,383,053 | 1/1995 | Hegg et al. . |
| 5,386,216 | 1/1995 | Iino . |
| 5,394,203 | 2/1995 | Murphy et al. . |
| 5,418,584 | 5/1995 | Larson . |
| 5,422,653 | 6/1995 | Maguire, Jr. . |
| 5,422,758 | 6/1995 | Lawson . |
| 5,426,521 | 6/1995 | Chen et al. . |
| 5,451,976 | 9/1995 | Ito . |
| 5,457,575 | 10/1995 | Groves et al. . |
| 5,467,104 | 11/1995 | Furness, III et al. . |
| 5,467,205 | 11/1995 | Kuba et al. . |
| 5,467,215 | 11/1995 | Lebby et al. . |
| 5,477,385 | 12/1995 | Freeman . |
| 5,479,224 | 12/1995 | Yasugaki et al. . |
| 5,483,307 | 1/1996 | Anderson . |
| 5,485,318 | 1/1996 | Lebby et al. . |
| 5,486,946 | 1/1996 | Jachimowicz et al. . |
| 5,491,491 | 2/1996 | Lebby et al. . |
| 5,499,138 | 3/1996 | Iba . |
| 5,506,595 | 4/1996 | Fukano et al. . |
| 5,506,728 | 4/1996 | Edwards . |
| 5,519,536 | 5/1996 | Hoehn . |
| 5,526,191 | 6/1996 | Nishii et al. . |
| 5,530,586 | 6/1996 | Yasugaki . |
| 5,537,260 | 7/1996 | Williamson . |
| 5,539,422 | 7/1996 | Heacock et al. . |
| 5,539,554 | 7/1996 | Lebby et al. . |
| 5,539,578 | 7/1996 | Togino et al. . |
| 5,543,958 | 8/1996 | Lebby et al. . |
| 5,546,227 | 8/1996 | Yasugaki et al. . |
| 5,552,934 | 9/1996 | Prince . |
| 5,552,943 | 9/1996 | Hirano et al. . |
| 5,557,353 | 9/1996 | Stahl . |
| 5,572,363 | 11/1996 | Fergason . |
| 5,579,026 | 11/1996 | Tabata . |
| 5,579,161 | 11/1996 | Sekiguchi . |
| 5,587,836 | 12/1996 | Takahashi et al. . |
| 5,596,433 | 1/1997 | Konuma . |
| 5,596,451 | 1/1997 | Handschy et al. . |
| 5,612,549 | 3/1997 | Nelson et al. . |
| 5,619,377 | 4/1997 | Rallison . |
| 5,627,678 | 5/1997 | Nishii et al. . |
| 5,638,218 | 6/1997 | Oomura . |
| 5,654,827 | 8/1997 | Reichert . |
| 5,659,430 | 8/1997 | Togino . |
| 5,661,604 | 8/1997 | Kuba . |

OTHER PUBLICATIONS

Frank L. Pedrotti, S.J., Introduction to Optics, Prentice Hall, Chapt. 5, "Aberration Theory".

B.E.A. Saleh and M.C. Teich, Fundatmentals of Photonics, John Wiley and Sons, pp. 135–139.

Young, J., "Head–Mounted Display", IBM Technical Disclosure Bulletin, vol. 25, No. 12, May 1983, pp. 6373–6374.

TWICE FOLDED COMPOUND MAGNIFIED VIRTUAL IMAGE ELECTRONIC DISPLAY

RELATIONSHIP TO COPENDING APPLICATION

This application is a continuation of application Ser. No. 08/441,529, filed May 15, 1995, now U.S. Pat. No. 5,684,497, which in turn is a continuation-in-part of application Ser. No. 08/407,102, filed Mar. 17, 1995, now U.S. Pat. No. 5,625,372, which in turn is a continuation-in-part of application Ser. No. 08/361,035, filed Dec. 21, 1994, now U.S. Pat. No. 5,644,323.

BACKGROUND OF THE INVENTION

1. Field of the Invention

The invention generally relates to a compact electronic display system. More specifically, the invention relates to a compact electronic display system which provides a virtual image of a microdisplay that has been compound magnified where a reflective function is used to fold the optical train of the electronic display onto itself.

1. Description of Related Art

A continuing objective in the field of electronics is the miniaturization of electronic devices. Most electronic devices include an electronic display. As a result, the miniaturization of electronic displays is critical to the production of a wide variety of compact electronic devices.

The purpose of an electronic display is to provide the eye with a visual image of certain information. This visual image may be provided as either a real image or a virtual image. A real image refers to an image which is observed directly by the unaided human eye. A photograph is an example of a real image. Electronic displays which provide a real image generally provide some form of display surface on which the real image is formed and viewed. A real image exists at a given location when, if a viewing surface is positioned at this location, a real image can be observed by the unaided eye. Examples of electronic displays which provide real images include liquid crystal displays, CRT monitors, and projection screens.

In real image electronic displays, the image viewed by the observer is an image created on or projected onto a display surface. As a result, the size of the display surface limits the size of the image that can be provided to the observer. Compact electronic devices, because of their small size, have limited space for a display surface and therefore are only able to accommodate a relatively small display image.

A relatively small display image creates a series of problems for the person viewing the image. The human eye is only able to resolve a limited amount of detail in an image. Two objects can be resolved by the eye as separate objects only when they are separated by a certain minimum angle as measured from the eye. The unaided human eye can resolve objects with an angle of separation of approximately 1–2 arc minutes or more.

The human eye also has difficulty focusing on source objects at very short distances from the eye without causing eye strain. The near point for the unaided human eye is defined as the closest distance that the eye can focus on an object without causing eye strain. The near point for the unaided human eye is about 25 cm for an average middle aged adult. The near point is much longer for an older adult and can be as long as 100 cm.

The display surface of a real image electronic display generally includes an array of small objects, called pixels, which form a real image on the display surface. For the reasons described above, the resolution of the unaided human eye and the near point of the eye determine the minimum pixel size that the unaided human eye can resolve. For an electronic display located at the near point for an average middle aged adult, the minimum separation between pixels that can be resolved by the unaided eye is about $75 \times 10^{-4}$ cm, or 75 microns. In order to accommodate for variations in the human eye, the minimum separation between pixels in a real image electronic display should preferably be larger than the minimum resolvable pixel size.

For small real image electronic displays, the display must be viewed at a distance close to the near point of the eye in order to provide the observer with a significant amount of information. As a result, the observer must focus his or her eyes on the small display. The need to focus on a small display each time the electronic display is used creates discomfort and eventually, unwanted eye strain on the observer. The problem of eye strain becomes particularly acute when the observer is only intermittently focusing on the electronic display. It therefore is desirable to employ an electronic display which minimizes the observer's need to refocus his or her eyes in order to view the electronic display.

Another important property of the human eye which determines the utility of an electronic display is the eye's angular field of view of an image. The eye can see over a field of view of up to 100 degrees. The full field of view, as it is referred to herein, is the circular field of view around the axis of the eye having a diameter equal to the largest dimension of the image being viewed. However, beyond 10–15 degrees from the center of the field, the resolution degrades significantly. A comfortable field of view for normal electronic display surfaces is typically in the range of 20–40 degrees. For real image displays, the field of view is defined as the ratio between the largest dimension of the display surface and the distance from the eye to the display. An example of a display surface with such a field of view would be a TV screen with a 100 cm diagonal viewed at 150 cm. The human eye compensates for the lower resolution at the edges of the display surface by scanning the eye across the display. The scanning of the eye is called eye roll. The eye roll moves the pupil of the eye. The typical distance for the motion of the pupil of an adult is about 1 cm.

An optical system can produce both real and virtual images. Several examples of electronic displays that provide a real image were discussed above. By contrast to a real image, a virtual image is an image which, if a viewing surface were positioned at the location of the virtual image, no image would be observed by the eye. An example of a virtual image is the image of fine print viewed through a magnifying glass. The print not only appears larger, it also appears to be located substantially behind the surface where the print actually exists. By definition, a virtual image can exist at a location where no display surface exists. The size of the virtual image therefore is not limited by the size of a display surface. Virtual image electronic displays thus have the advantage of eliminating the need for a large display surface in order to produce a large electronic image.

A virtual image electronic display must initially form a source object which is then imaged by an optical system to create the virtual image. A substantial advantage of a virtual image electronic display is that the source object initially created may be as small as can be usefully reimaged by the optical system. As a result, virtual image electronic displays may effectively utilize very small microdisplays to form the source object. Pixel sizes may be as small as a few microns in diameter, a size which the unaided eye cannot resolve. Rather, in order to view the source object formed by the microdisplay, substantial magnification of the optical system is required.

A virtual image must be created by an optical system of some kind. In a real image electronic display, it is the eye and the viewing surface properties which determine the viewing parameters. By contrast, in a virtual image display, the optical system determines most of the viewing parameters.

There are three important parameters relating to the ease of viewing the image associated with virtual image displays. The first parameter is the far point which refers to the maximum distance from the eye which the optical system can be held and have the eye still see the entire virtual image. Optical devices which provide a far point which is a short distance from the optic are undesirable due to the inconvenience and discomfort associated with placing the eye in close proximity with the optic. It is therefore preferred that an optic provide a long far point in order to enable the magnified image to be viewed through the optic at a comfortable and convenient range of distances from the optic.

The second parameter relating to the ease of viewing a virtual image is the apparent angular width of the virtual image, commonly referred to as the field of view of the virtual image. The full field of view is defined as the ratio of the largest apparent dimension of the virtual image to the apparent distance to the virtual image. It is generally equivalent to the field of view for a real image display surface.

The third parameter relating to the ease of viewing a virtual image is the transverse distance that the eye may move with respect to the optical system and still have the eye see the entire virtual image through the optical system.

A variety of electronic display systems have been developed for providing a virtual image to the observer. Virtual image electronic display systems may generally be divided into two broad classes, on-axis display systems and off-axis display systems. An on-axis display system refers to a system having components symmetrical about a common optical axis. In a typical on-axis system, any of the component(s) forming the on-axis display system can be rotated about the optical axis without disturbing the display system.

On-axis display systems provide the advantage of producing virtual images with a minimal amount of aberrations. However, on-axis display systems have the disadvantage of being spatially inefficient due to the linear arrangement of the optical components.

By contrast, off-axis display systems refer to display systems where one or more components are positioned such that the symmetry around the optical axis is removed. Any optical system that includes tilted or displaced optics is an off-axis optical system as that term is used herein. By placing one or more components off-axis, off-axis display systems can be adapted to efficiently fit within the contours of the devices in which they are used. However, off-axis display systems have the disadvantage that redirecting an image off-axis introduces aberrations into the image which can significantly deteriorate the image quality produced. The image quality can frequently be enhanced using additional optical elements which reduce the significance of the aberrations. However, these additional optical elements add to the size, complexity and cost of the display.

Off-axis display systems commonly employ optical components having a reflective optical surface, such as a concave reflective mirror, in order to redirect the optical train off-axis. Examples of prior art off-axis electronic display systems employing a reflective element include U.S. Pat. No. 3,296,509, U.S. Pat. No. 4,717,248, U.S. Pat. No. 5,087,166, U.S. Pat. No. 5,157,503, U.S. Pat. No. 5,291,338, U.S. Pat. No. 5,305,124 and U.S. Pat. No. 5,357,372.

One problem associated with the use of a reflective optical surface is that the optical path on the object side of the surface and the optical path on the image side of the surface traverse the same physical space. This problem is generally avoided through the use of a second reflective surface, such as a beam splitter, or an optical element, such as an optical grating, which diverts the reflected image of the object off-axis.

A significant advantage associated with compact electronic displays is the fact that they are portable. It is therefore impractical and disadvantageous for a compact electronic display to rely on an external power source. The illumination source used in the electronic display generally requires the greatest amount of energy of the various components used in the electronic display. It is therefore important that the electronic display have an optical design which efficiently uses the illumination source used to form the virtual image.

A need also currently exists for an inexpensive, compact virtual image electronic display that is positionable within a small volume, that provides the observer with a large field of view, a virtual image with a significant degree of eye relief and a large translational distance. In particular, an electronic display system is currently needed which combines the image quality and light efficiency advantages of an on-axis display system with the spacial efficiency provided by off-axis display systems.

SUMMARY OF THE INVENTION

A compact, virtual image electronic display system is provided for forming a compound magnified virtual image of a source object. The display system includes a microdisplay for producing the source object, a first reflective magnification optic, and a second magnification optic which, in combination with the first magnification optic, forms a compound magnified virtual image. The first and second magnification optics may be separate optics. Alternatively, as described herein, a single beamsplitting magnification optic may be used as both the first and second magnification optic.

When a single beamsplitting magnification optic is employed in combination with a reflective element, the beamsplitting magnification optic serves as both a first, reflective magnification optic to produce a magnified virtual image and as a second, transmissive magnification optic to produce a compound magnified virtual image which is seen by the observer. By using the same optic in a reflective mode as the first magnification optic and in a transmissive mode as the second magnification optic, any aberrations introduced into the image during the first stage of magnification are substantially removed during the second stage of magnification. As a result, the compound magnified virtual image produced is substantially aberration free.

The microdisplay and the first magnification optic each have a centerpoint which serves to define a first optical axis. The first magnification optic magnifies the source object to provide a magnified virtual image, the center of the magnified virtual image defining a second optical axis, the second optical axis being at an angle $\phi$ relative to the first optical axis. The second magnification optic provides a compound magnified virtual image of the magnified virtual image within the full field of view provided to an observer by the second magnification optic. By making the angle between the first and second optical axes sufficiently small that the source object is within the full field of view provided by the optic serving as the second magnification optic, the thickness of the display system along the first optical axis is reduced to less than about 20 mm and more preferably less than about 10 mm. When a single beamsplitting magnification optic is used as both the first and second magnification optic, the thickness of the display system along the first optical axis may be further reduced to less than about 7 mm.

The display system of the present invention provides a compound magnified virtual image which is magnified relative to the source object by a factor of at least about 10 and more preferably by a factor of at least about 20. In addition, because the display system is designed to direct most of the imaging light toward the observer's eye, the amount of light needed to illuminate the exit pupil of the device is significantly smaller than traditional displays. In a preferred embodiment, the angle between the first and second optical axes is equal to or less than about 10° and is more preferably equal to or less than about 5°. At these smaller angles, the amount of aberrations in the compound magnified virtual image are significantly reduced.

Any electronically controllable microdisplay may be used in the present invention. When a single beamsplitting magnification optic is employed as both the first and second magnification optics, the microdisplay is preferably a reflective spatial light modulator. The microdisplay is preferably positioned within the full field of view of the compound magnified virtual image. Accordingly, the observer effectively looks through the microdisplay when viewing the compound magnified virtual image, assuming the optic serving as the second magnification optic is spherically shaped.

The microdisplay preferably forms a source object having an area equal to or less than 400 mm$^2$. The microdisplay is also preferably formed of an array of pixels where each pixel has an area equal to or less than about 0.25 mm$^2$.

In a further, preferred embodiment, the display system includes an eye position sensor system which enables the observer to use his or her eye to interact with a control device which controls the source object produced by the microdisplay and/or functions that the display system performs.

BRIEF DESCRIPTION OF THE DRAWINGS

FIGS. 6A–B illustrate an expandable and contractible display system including a beamsplitting magnification optic and a reflective element in which FIG. 6A illustrates the display system in its contracted state and FIG. 6B illustrates the display system in its expanded state.

FIGS. 10A–B illustrates an alternate embodiment of the display system in which FIG. 10A illustrates the use of quarter wave guides to prevent light not constituting the compound magnified virtual image from reaching the observer and FIG. 10B illustrates the light emitting diode used in the display.

DESCRIPTION OF THE PREFERRED EMBODIMENTS

The present invention relates to an inexpensive, compact virtual image electronic display including a first and a second magnification optic which provide a compound magnified virtual image of a source object formed by a microdisplay where one of the magnification optics is reflective and is used to fold the optical train of the display onto itself, thereby enabling the display system to be housed in a compact volume.

Figure 1:
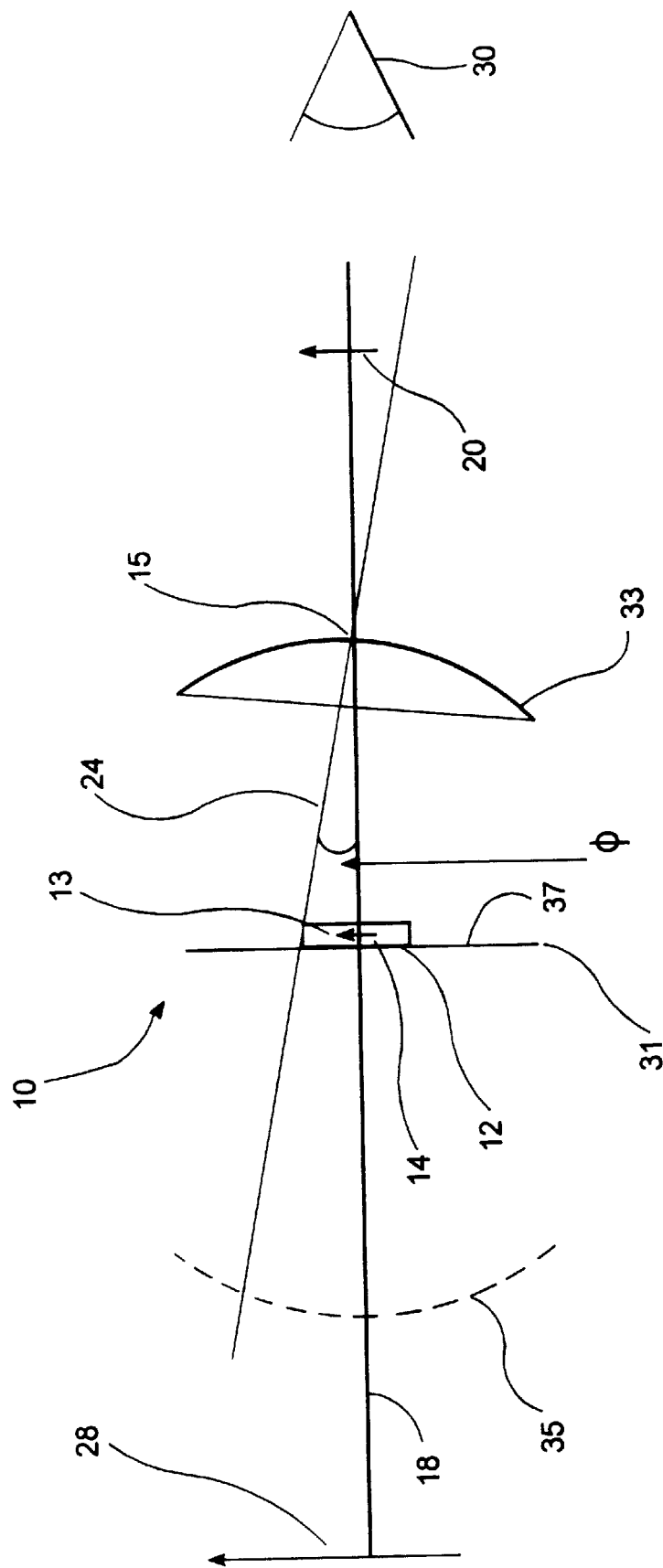
FIG. 1 illustrates a display system of the present invention in which a beamsplitting magnification optic is employed as the first and second magnification optics.

FIG. 1 illustrates a particularly preferred embodiment of the display system in which a single beamsplitting magnification optic is employed as both first and second magnification optic. As illustrated in FIG. 1, the virtual image electronic display system 10 includes a beamsplitting magnification optic 33 and a microdisplay 12 for producing a source object 14.

In general, in order for a magnification optic to magnify a source object, the magnification optic must be positioned some distance away from the source object. When a single beamsplitting magnification optic is used, the microdisplay is positioned away from the beamsplitting magnification optic and in the proximity with the reflective element 31. The microdisplay 12 is preferably positioned between about 3 and 15 mm from the beamsplitting magnification optic 33, more preferably between about 5 and 10 mm from the beamsplitting magnification optic 33. It is also preferred that the microdisplay 12 be positioned adjacent the reflective surface 37 of the reflective element 31 opposite the beamsplitting magnification optic 33, the reflective surface 37 providing a convenient support structure on which to mount the microdisplay 12.

The centerpoint 13 of microdisplay 12 and the centerpoint 15 of the beamsplitting magnification optic 33 define a first optical axis 18 centered along which the source object 14 is projected toward the beamsplitting magnification optic 33.

Incorporated into the beamsplitting magnification optic 33 is a magnification function and a reflection function such that the beamsplitting magnification optic 33 images the source object 14 and reflects a magnified virtual image 20 of the source object 14 toward the reflective element 31. The center of the imaging rays 22 forming the reflected magnified virtual image 20 define a second optical axis 24 that is at an angle φ relative to the first optical axis 18. The angle φ between the first and second optical axes is equal to or less than about 40° and is preferably equal to or less than about 10° and more preferably equal to or less than about 5°.

The beamsplitting magnification optic 33 also serves as the second transmissive magnification optic in the display system. More specifically, the imaging rays 22 forming the reflected magnified virtual image 20 are reflected off the reflective element 31 back toward the beamsplitting magnification optic 33 which then magnifies the magnified virtual image 20 to produce a compound magnified virtual image 28 of the source object 14 to an observer 30.

Figure 2:
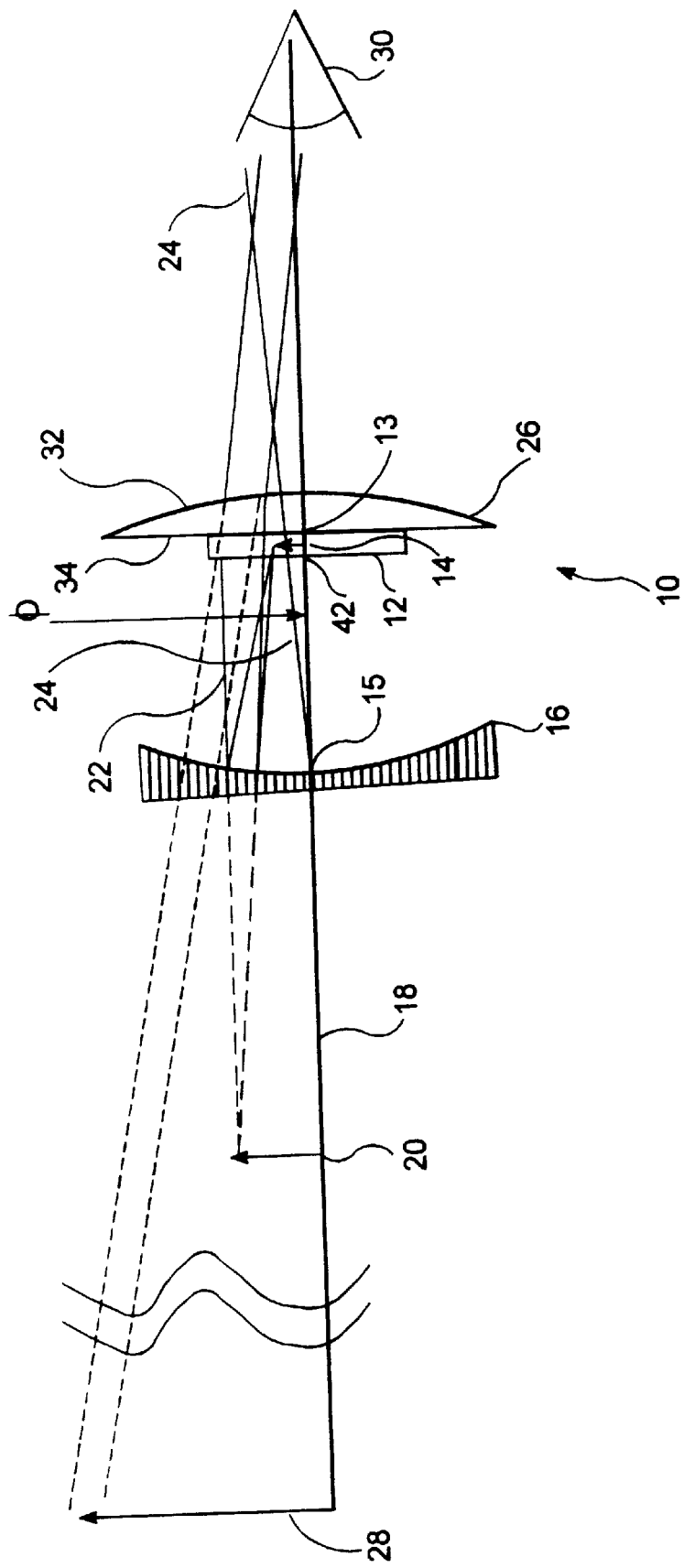
FIG. 2 illustrates a display system in which separate first and second magnification optics are used.

Display systems as illustrated in FIG. 1 where a beamsplitting magnification optic 33 is used as both a first and a second magnification optic are optically equivalent to an alternate embodiment of the invention illustrated in FIG. 2 in which separate first and second magnification optics are used. Display systems according to FIG. 2 have previously been described in detail in "Compact Compound Magnified Virtual Image Electronic Display," application Ser. No.: 08/407,102; Filed: Mar. 17, 1995, which is incorporated herein by reference.

As illustrated in FIG. 2, the display system includes a microdisplay 12 for producing a source object 14 and a first magnification optic 16 positioned along a first optical axis 18, the first optical axis being defined by the centerpoint 13 of microdisplay 12 and the centerpoint 15 of the first magnification optic 16. The source object 14 is projected toward the first magnification optic 16 and is centered upon the first optical axis 18. In a preferred embodiment, the microdisplay 12 is positioned adjacent, i.e., within about 3 mm, of either the proximal 32 or distal 34 refractive surface of the second magnification optic 26.

Incorporated into the first magnification optic is a magnification function and a reflection function such that the first magnification optic 16 images the source object 14 and provides a magnified virtual image 20 of the source object 14 in the direction of the observer 30. The center of the imaging rays 22 forming the magnified virtual image 20 define a second optical axis 24 that is at an angle φ relative to the first optical axis 18. The displacement angle φ of the second optical axis 24 relative to the first optical axis 18 is equal to twice the tilt angle of the normal to the center of curvature of the first magnification optic if the optic is tilted. The displacement angle φ is also equal to twice the distance of the normal to the center of curvature of the first magnification optic 16 divided by the radius of curvature of the first magnification optic 16 if the first magnification optic 16 is off center.

The virtual image electronic display system also includes a second magnification optic 26 which receives the magnified virtual image 20 and provides a compound magnified virtual image 28 of the source object 14 to the observer 30 within the full field of view.

As illustrated in FIG. 1, In a preferred embodiment, the electronic display also includes an intermediate image synthesizing optic which provides a synthesized electronic display with enhanced eye relief and a wider field of view than is possible using a traditional compound magnification system. For example, the synthesized electronic display enables the observer to view the display over a 34 degree full angle field of view with at least about a 35 mm eye relief.

The image synthesizing optic 42 should be positioned at or adjacent to the source object plane. Thus, the image synthesizing optic 42 is preferably position adjacent to or integrally incorporated into the microdisplay 12.

The image synthesizing optic 42 may be any optic which produces a directly viewable image when placed in the source object plane of a magnification optic.

The image synthesizing optic 42 is preferably designed such that a large fraction of the light is redirected so that the entirety of the image remains visible as the eye is moved laterally relative to the second stage magnification optic 26. In order to achieve the desired amount of light redirection, the numerical aperture of the directed light is preferably on the order of the (radius of the second stage magnification optic) / (focal length of the second stage magnification optic). Reflective element 31 creates a virtual beamsplitting magnification optic, depicted in dashed lines as element 35. This virtual beamsplitting magnification optic 35 is in roughly the same position as the first magnification optic 16 illustrated in FIG. 2. Thus, use of the reflective element 31, in combination with the beamsplitting magnification optic 33, enables the beamsplitting magnification optic 33 to function as both the first and second magnification optic as described in application Ser. No.: 08/407,102.

By using a single beamsplitting magnification optic in both a reflective mode as the first magnification optic and in a transmissive mode as the second magnification optic, as illustrated in FIG. 1, the partially reflective optic 33 serves as its own complementary optic, cancelling out many of the aberrations introduced into the image by the first stage of magnification during the second stage of magnification. As a result, the compound magnified virtual image produced is substantially free of aberrations.

The use of a single beamsplitting magnification optic also provides the advantage that the optical train is folded onto itself a second time. As a result, the spacing between the components employed in the embodiment of the synthesized display illustrated in FIG. 1 is further reduced over that which is achieved using separate first and second magnification optics. For example, by using a reflective element 31 in combination with the beamsplitting magnification optic 33, the thickness of the display system along the first optical axis may be reduced to less than about 15 mm and preferably less than about 7 mm.

Figure 3:
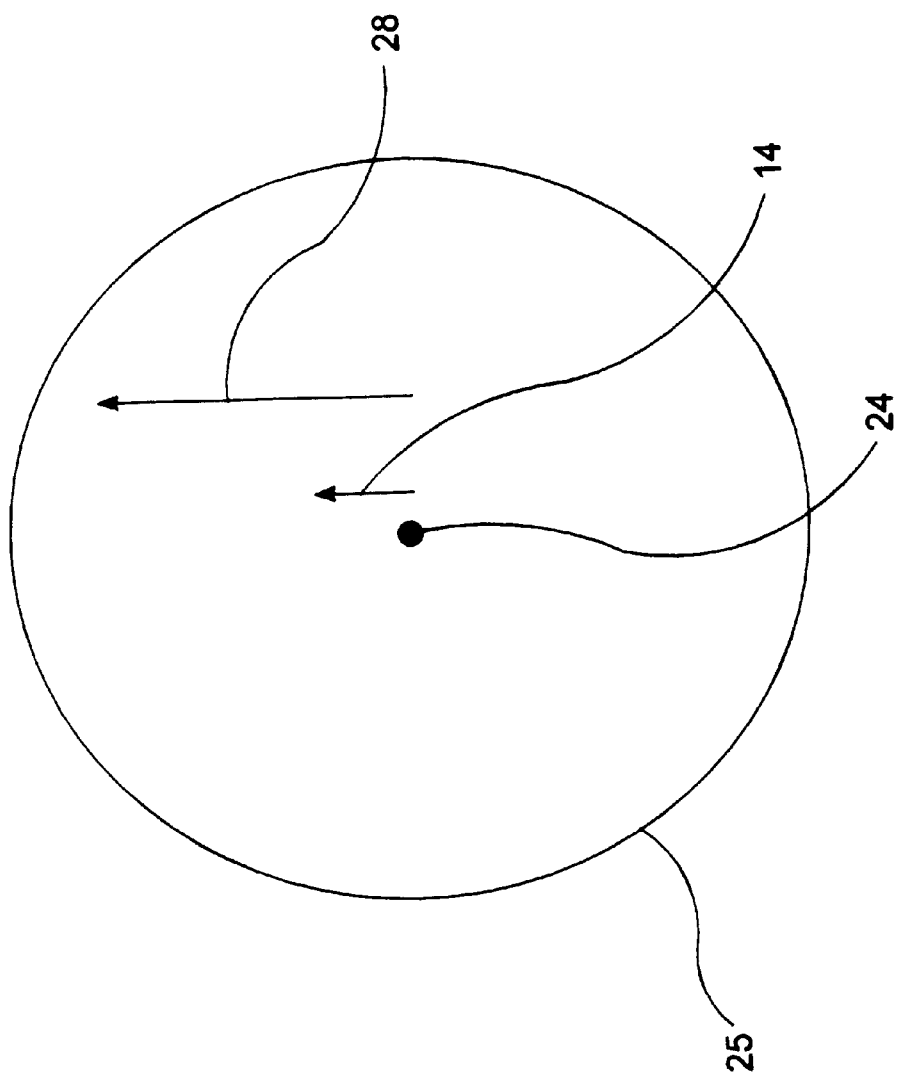
FIG. 3 illustrates the alignment of the second optical axis relative to the first optical axis such that the source object produced by the microdisplay is within the full field of view of the compound magnified virtual image.

Regardless of whether separate first and second magnification optics are used, the second optical axis is preferably aligned relative to the first optical axis as illustrated in FIG. 3 such that the source object 14 produced by the microdisplay 12 is within the full field of view 25 of the second magnification optic 26. This generally requires that φ be less than about 40°. Accordingly, the observer effectively looks through the microdisplay when viewing the compound magnified virtual image 28. "Full field of view," as the term is used herein, is intended to indicate that if one were to block a portion of the field of view 25 illustrated in FIG. 3 such that the observer is not effectively looking through the microdisplay when viewing the compound magnified virtual image 28, the full field of view nonetheless refers to the entire circular field of view as illustrated in FIG. 3. It is preferred that the angle between the first and second optical axes is equal to or less than about 10° and more preferably equal to or less than about 5°. At these smaller angles, the amount of aberrations in the compound magnified virtual image are significantly reduced.

The electronic display systems of the present invention preferably provide an eye relief equal to or greater than about 15 mm, more preferably equal to or greater than about 25 mm, most preferably equal to or greater than about 35 mm. The electronic display also preferably provides an image which is at least equivalent in size to a computer monitor (24 cm×18 cm) when viewed at 50 cm. This size is roughly equivalent to a large screen TV (100 cm diagonal) when viewed at 165 cm. The electronic display also preferably provides about a 34° field of view (17° to either side of the central optical axis).

When a single beamsplitting magnification optic is employed, the beamsplitting magnification optic preferably provides a compound magnified virtual image that is magnified by a factor of at least 10 relative to the source object, more preferably a factor of at least 20. The beamsplitting magnification optic also preferably has a focal length between about 25 mm and 100 mm. It is also preferred that the beamsplitting magnification optic be between about 25% and 75% reflective, most preferably about 50% reflective.

The beamsplitting magnification optic may include a simple single optic as illustrated in FIG. 1. Alternatively, more complex optics may be used as the beamsplitting magnification optic and are intended to fall within the scope of the present invention. FIGS. 4A–D illustrate a series of optical designs which may be incorporated into the beamsplitting magnification optic in the display systems of the present invention. It should be understood that the series of optical designs illustrated in FIGS. 4A–D are in no way exhaustive of the different optical designs that may be used.

Figure 4A:
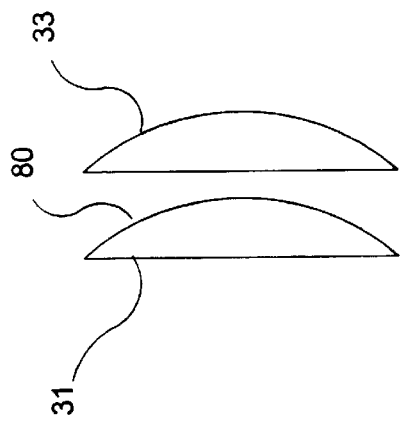
FIGS. 4A–D illustrate a series of beamsplitting magnification optics which may be used as the beamsplitting magnification.
Figure 4B:
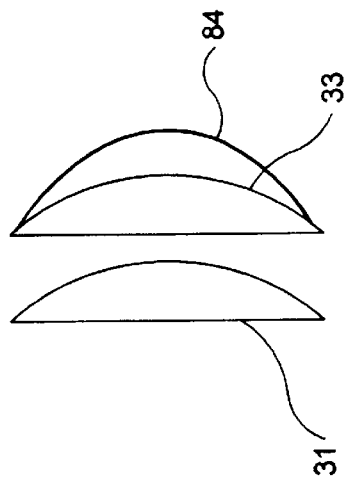
Figure 4C:
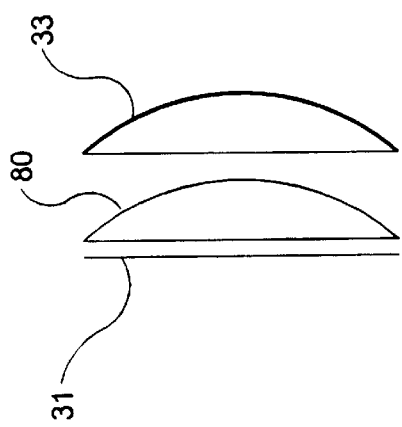
Figure 4D:
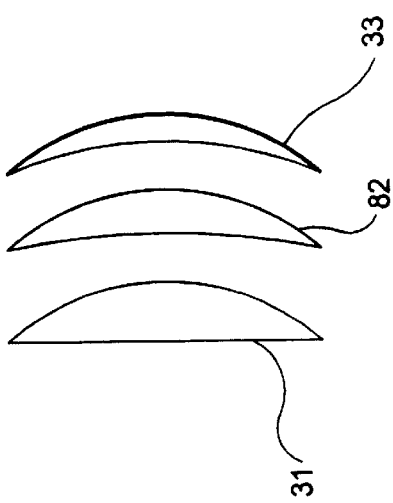

FIG. 4A illustrates an additional optical element 80 being inserted between the beamsplitting magnification optic 33 and the reflective element 31. FIG. 4B illustrates an additional optical element 80 where the reflective element 31 has been integrally incorporated into the additional optical element 80. FIG. 4C illustrates an optical system similar to the optical system illustrated in FIG. 4B except that an additional optical element 82 has been inserted into the system. FIG. 4D illustrates an optical system where an additional optical element 84 has been added after the beamsplitting magnification optic 33.

The additional optical elements in all of the optical systems illustrated in FIGS. 4A–D can be used to correct optical aberrations including field curvature, coma, astigmatism and distortion. In addition, the shapes of the surfaces of the optical elements can be any aspheric optical surface. The optical materials used to form the optical elements can be different for the different optical elements.

The electronic display systems of the present invention are intended as inexpensive electronic components which may be incorporated into any electronic device in which an electronic display is used. In particular, the display system is designed for use in pocket-sized electronic devices. Examples of such devices include, but are not limited to, portable computers, personal communicators, personal digital assistants, modems, pagers, video and camera viewfinders, mobile phones, television monitors and other hand held devices.

When a beamsplitting magnification optic 33 is used in place of separate first and second magnification optics, as illustrated in FIG. 1, only a portion of the light forming the magnified virtual image is reflected by the optic. When the beamsplitting magnification optic 33 images the source object 14 and reflects a magnified virtual image 20 toward the reflective element 31, a portion of the light is transmitted through the beamsplitting magnification optic 33 toward the observer 30, the percentage depending on the beamsplitting optic used. The light transmitted through the beamsplitting magnification optic 33 is generally not in focus and thus does not interfere with the observer's perception of the compound magnified virtual image 28, except with regard to contrast ratio.

In addition, only a portion of the imaging rays 22 forming the reflected magnified virtual image 20 are transmitted through the beamsplitting magnification optic 33 as the compound magnified virtual image 28 to the observer 30. The other portion of the light is reflected by the beamsplitting magnification optic 33 toward the reflective element 31. This reduces the light intensity of the compound magnified virtual image 28 provided to the observer 30.

As discussed herein, the display system may include additional components which reduce the amount of light transmitted through the beamsplitting magnification optic 33 which does not correspond to the compound magnified virtual image, thereby improving the image contrast ratio provided to the observer by the display system.

Figure 5:
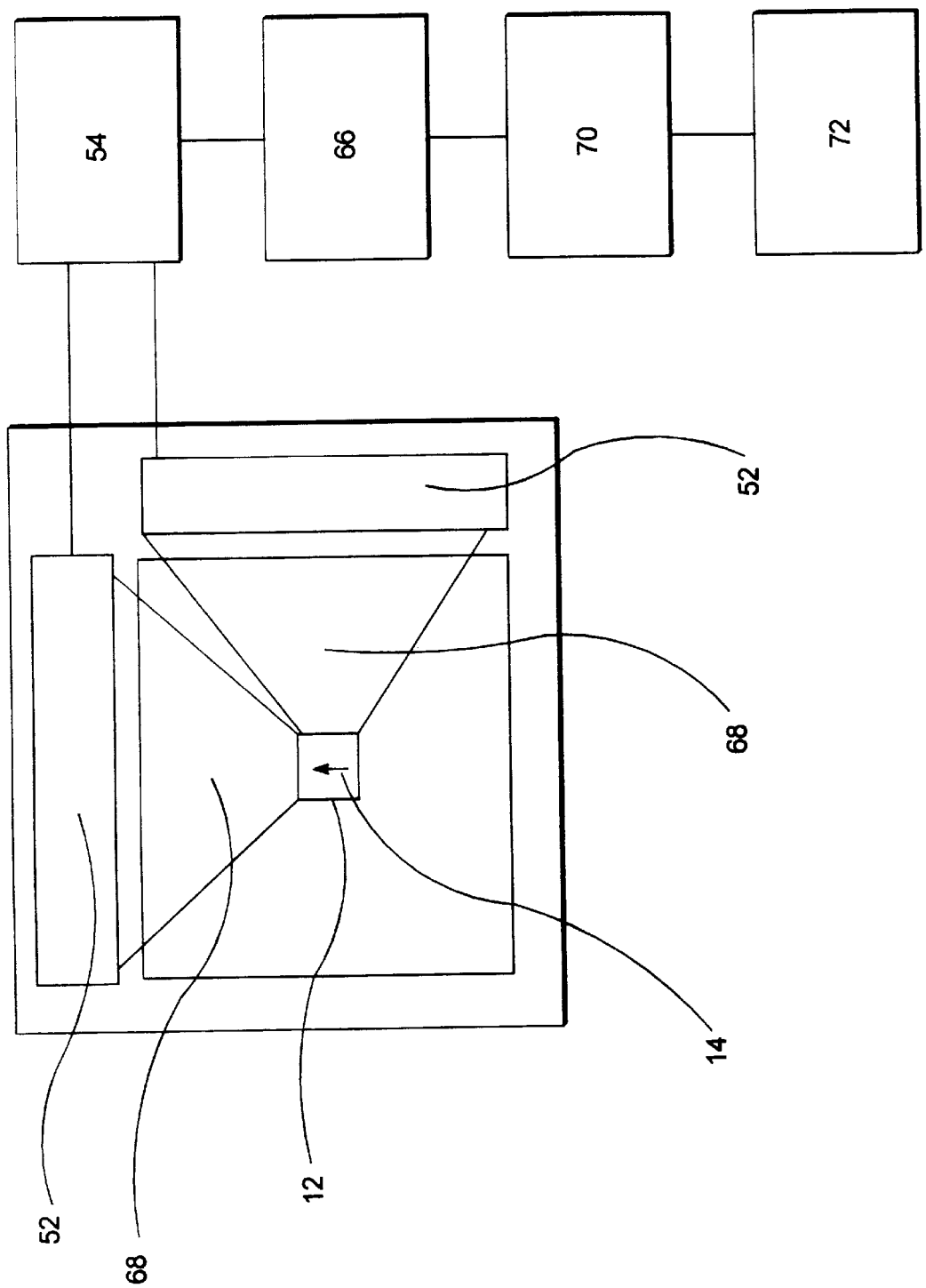
FIG. 5 illustrates the electronics included within the display system for controlling the microdisplay.

FIG. 5 illustrates the electronics included within the display system for controlling the microdisplay. As illustrated in FIG. 5, the microdisplay 12 includes an input 52 which is electronically attached by electrodes 68 to the microdisplay 12. Also connected to the input 52 is a control device 54 for conveying electrical signals through the input to control the generation of the source object 14. The control device 54 may also be connected to a logic processor 66 which is also connected to external memory 70 which may be controlled through an external data source 72. In a preferred embodiment, the microdisplay 12 is a row-column addressed display system. The microdisplay 12 is connected to the input 52 such as shift registers through optically transparent electrodes 68 such as indium tin oxide or any other suitable optical transparent conducting material. The input 52, shift registers are connected to a control device 54 such as a character generator with timing and decoding logic. The control device 54 is controlled by a processor 66 which manipulates the data from the external memory 70. The external memory receives the information from the external data source 72 such as an external radio receiver. The external data source 72 could also be infrared diode data link to another computer, LAN system, or any other device capable of sending analog or digital communications. In a preferred embodiment, the external memory 70 and external data source 72 is a separate PCMCIA card which can be connected to a computer or communication system.

Figure 6B:
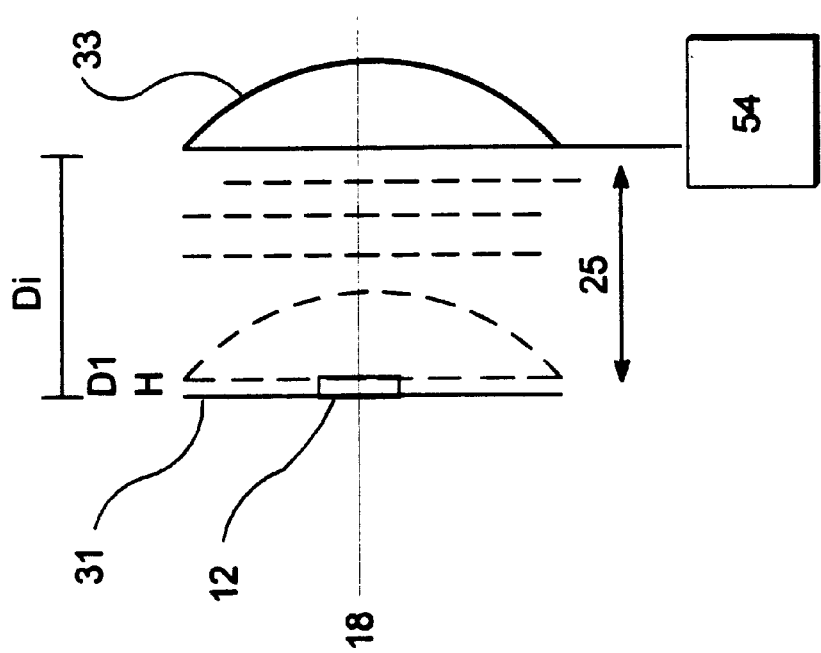
Figure 6A:
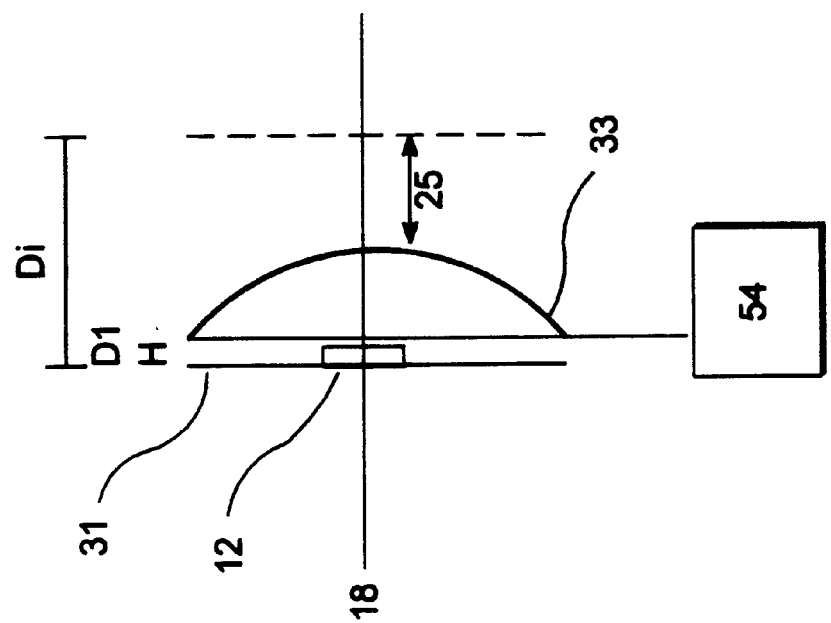

The display systems of the present invention can be modified to be expandable and contractible along the first optical axis 18. As illustrated in FIG. 6A, the display system can be contracted such that the beamsplitting magnification optic 33 is brought in contact with the reflective element 31. As illustrated in FIG. 6B, the display system can be expanded by increasing the distance 25 between the beamsplitting magnification optic 33 and the reflective element 31. When the display system is expandable and contractible, the display system may be designed such that there are a series of distances $D_1$–$D_i$ at which the beamsplitting magnification optic 33 may be positioned relative to the reflective element 31. In an alternate, preferred embodiment, the distance 25 between the beamsplitting magnification optic 33 and the reflective element 31 can be adjusted to any distance between $D_1$ and $D_i$.

When the display system is in a contracted state, eye relief provided by the display system is maximized. However, the magnification provided by the display system is reduced. As the display system is expanded, the magnification provided by the display system increases and the eye relief decreases. The adjustability of the separation between the beamsplitting magnification optic 33 and the reflective element 31 thus provides the observer with the ability to adjust the magnification and ergonomics of the display system.

The display system preferably includes a distance adjusting mechanism which adjusts the distance between the beamsplitting magnification optic 33 and the reflective element 31. The distance adjusting mechanism is preferably controllable by the observer.

The display system also preferably includes a distance sensing mechanism which senses the distance 25 between the beamsplitting magnification optic 33 and the reflective element 31 and conveys a control signal to the control device 54 indicating the distance. Information regarding the distance between the beamsplitting magnification optic 33 and the reflective element 31 can then be employed by the control device 54 to modulate the source object formed by the microdisplay. For example, the sensed distance between the beamsplitting magnification optic 33 and the reflective element 31 can be used by the control device 54 to modulate the size of the characters formed by the microdisplay since the distance 25 dictates the magnification of the source object 14 provided by the display system.

Modulation of the source object may be performed automatically or in response to a control signal provided by the observer (e.g., the observer presses a button). For example, the display system may include a control mechanism which enables the observer to modify the size of the source object by sending a control signal to the control device.

Modulation of the magnification and focus of the display system may also be performed automatically or in response to a control signal provided by the observer. For example, the display system may include a control mechanism which enables the observer to control the distance adjusting mechanism, thereby controlling the distance between the first and second magnification optics.

The microdisplay 12 used in the display system 10 of the present invention may be any electronically activated display which can produce a source object of any type. For example, the microdisplay may be a liquid crystal display, a spatial light modulator, a grating, a mirror light valve or a LED array. Microdisplays may generally divided into two categories, reflective and light transmissive displays.

When the microdisplay is reflective, the microdisplay does not permit light to pass through the display. Therefore, when a reflective microdisplay is positioned within the full field of view, one must look around the microdisplay in order to see the compound magnified virtual image. When the microdisplay is larger than the pupil size of the eye, generally between about 3–7 mm, substantial vignetting of the compound magnified virtual image can occur. It is therefore preferred that the reflective microdisplay be as small as possible, preferably equal to or less than 49 mm$^2$ and more preferably equal to or less than 9 mm$^2$.

When the microdisplay is light transmissive, it is possible to view the compound magnified virtual image by looking through the microdisplay. Therefore, there is no size constraint on the microdisplay when the microdisplay is substantially light transmissive such that the microdisplay may be larger than the pupil size of the eye. A scattering mode liquid crystal display is an example of a substantially light transmissive microdisplay.

The microdisplay 12 preferably produces a source object having a surface area equal to or less than about 25 mm$^2$, most preferably equal to or less than about 9 mm$^2$. However, it should be understood that microdisplays which can produce larger source objects may be employed. It is also preferred that the microdisplay 12 form a source object 14 using an array of pixels 11 on the microdisplay 12 wherein each pixel has an area equal to or less than about 1600 square microns, more preferably equal to or less than about 25 square microns.

In one embodiment of the present invention, the microdisplay 12 used to form the source object 14 is a spatial light modulator. Spatial light modulators, also known as light valves, are well known in the art for use in electronic display systems. In general, a spatial light modulator includes an addressable array of light modulating mirror elements which modulate incident light in a spatial pattern to produce an image. The array of modulating elements are modulated in response to an electrical or optical input where each light modulating element corresponds to a pixel of the image generated by the light modulator. Incident light may be modulated by the modulating elements with regard to phase, intensity, polarization, or direction. Light modulation may be achieved using a variety of materials exhibiting electrooptic or magnetooptic effects and by materials that modulate light by surface deformation. Electrical control of the addressable mirror elements forming the spatial modulator is described in U.S. Pat. No. 4,441,791 issued to Hornbeck which is incorporated herein by reference. In the present invention, a spatial light modulator is used to form a source object which is then magnified in two magnification stages. Examples of spatial light modulators that may be used in the synthesized display of the present invention and their principle of operation are described in U.S. Pat. Nos. 4,638,309, 4,680,579 issued to Ott, U.S. Pat. No. 5,287,215 issued to Warde, U.S. Pat. Nos. 4,441,791, 4,710,732, 4,596,992, 4,615,595, 4,662,746 and 5,061,049, 5,280,277 issued to Hornbeck, U.S. Pat. Nos. 5,287,096 and U.S. Pat. No. 5,170,283 issued to O'Brien, all of which are incorporated herein by reference. When a single beamsplitting magnification optic is used as both the first and second magnification optic, it is preferred that the microdisplay be a reflective spatial light modulator.

In an alternate embodiment, the microdisplay is a light transmissive microdisplay. In general, a light transmissive microdisplay is any electronically activated display which produces an image of any type which, when light is transmitted through the microdisplay, some fraction of the light passing through the display is not modulated by either phase, polarization, direction or intensity. For example, a number of liquid crystal displays modulate the polarization of light. By using a light polarizing liquid crystal display in combination with one or more polarizing elements, a substantially light transmissive microdisplay can be formed. In a particularly preferred embodiment, the liquid crystal display is a cholesteric-nematic phase transition liquid crystal display. This type of display scatters some of the light through the display.

As illustrated in FIG. 3, the imaging rays 22 forming the magnified virtual image 20 are preferably arranged in such a manner that the second optical axis is aligned relative to the first optical axis such that the source object 14 produced by the microdisplay 12 is within the field of view 25 of the compound magnified virtual image 28. This generally requires that the second optical axis 24 be within about 40° of the first optical axis 18. When the source object 14 produced by the microdisplay 12 is within the field of view 25 of the compound magnified virtual image 28, the observer effectively looks through the microdisplay to visualize the compound magnified virtual image 28 because the microdisplay 12 is positioned in the near field of the observer's vision when the observer is focusing on the compound magnified virtual image 28 positioned in the observer's far field of vision.

Illumination is generally required to project the source object 14 formed by the microdisplay 12 onto the magnification optic. When the microdisplay is a light transmissive microdisplay, illumination is provided from the rear of the microdisplay. When the microdisplay is a reflective, illumination is provided so that the illumination is reflected off the imaging surface of the microdisplay onto the optic serving as the first magnification optic.

Figure 7:
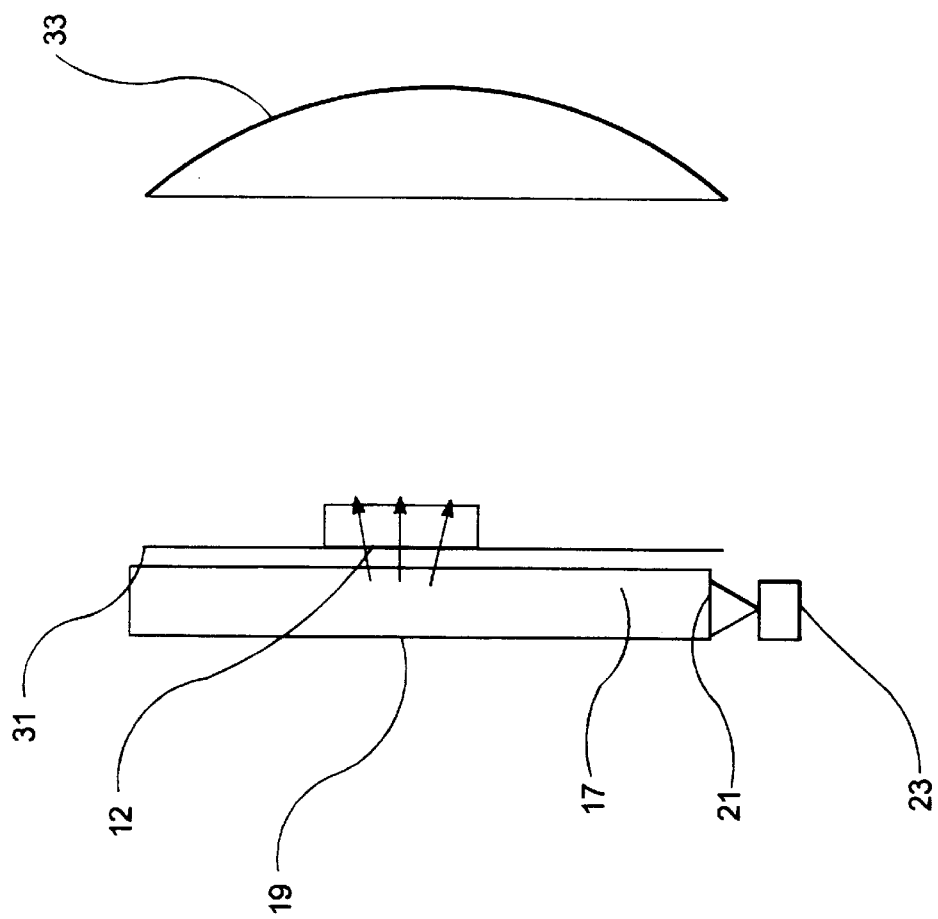
FIG. 7 illustrates a display system in which a waveguide is used to illuminate a light transmissive microdisplay.

One approach to providing illumination to a light transmissive microdisplay is through the use of a wave guide. As illustrated in FIG. 7, an optical wave guide 17 may be formed by two glass plates 19 which are also used to form a cholesteric-nematic phase transition liquid crystal display microdisplay 12. Illumination is introduced into the wave guide 17 at one side 21 of the glass plates 19 by an illumination source 23. The illumination introduced into the wave guide 17 is then scattered by the cholesteric-nematic phase transition liquid crystal display such that some of the illumination is directed toward the beamsplitting magnification optic 33. Illumination may also be provided to a light transmissive microdisplay using a direct light source, such as a light emitting diode, positioned behind the light transmissive microdisplay. A variety of other methods are known in the art for providing illumination to a light transmissive microdisplay and are intended to fall within the scope of the present invention.

Figure 8:
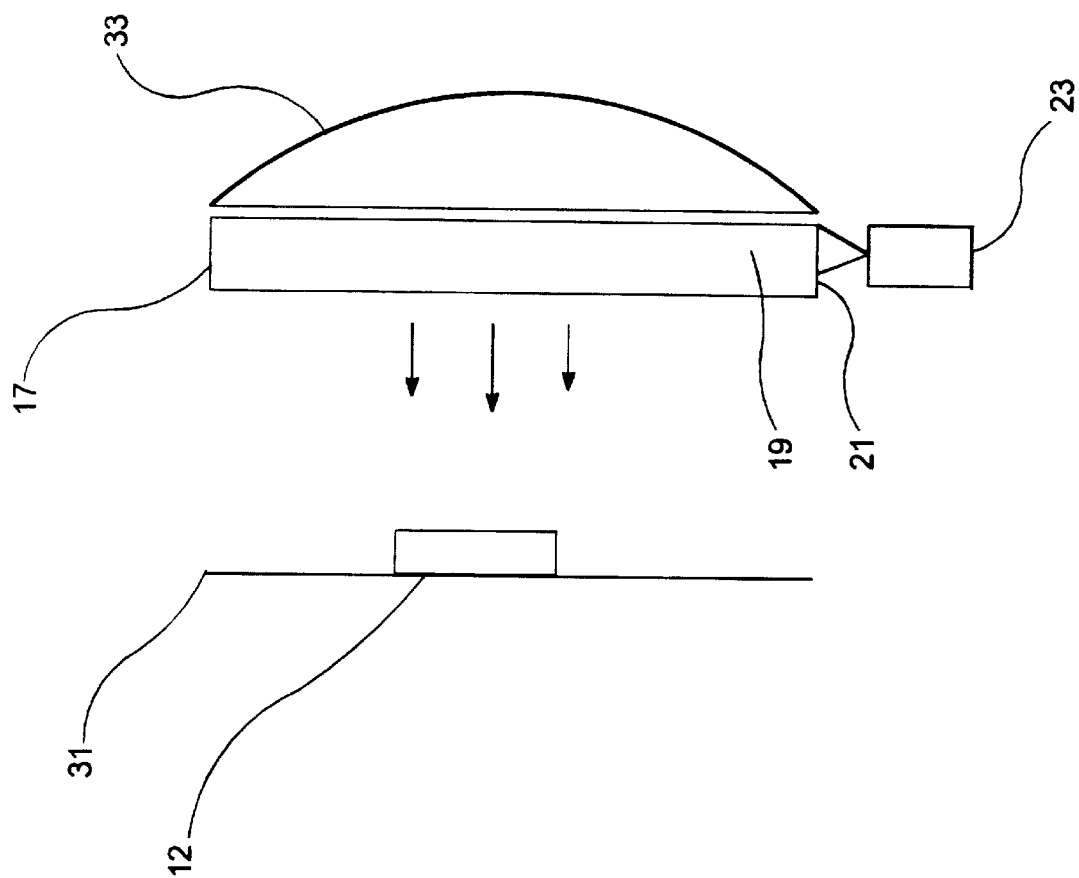
FIG. 8 illustrates a display system in which a waveguide is used to illuminate a light transmissive microdisplay.

One approach to providing illumination to a reflective microdisplay is also through the use of a wave guide. As illustrated in FIG. 8, an optical wave guide 17 may be formed by two glass plates 19. Illumination is introduced into the wave guide 17 at one side 21 of the glass plates 19 by an illumination source 23. The waveguide is designed to direct illumination toward the reflective microdisplay 12.

Figure 9:
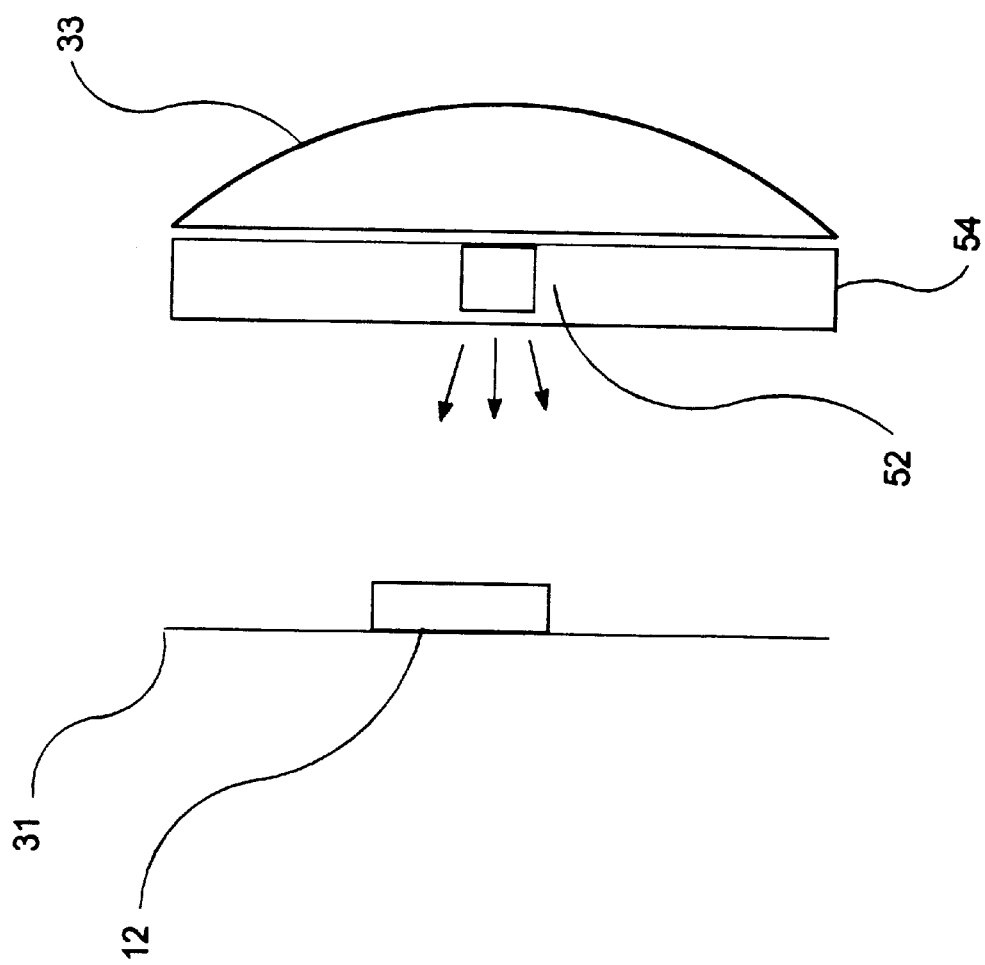
FIG. 9 illustrates a display system in which a light emitting diode is used as the illumination source.

An alternate approach to providing illumination to a reflective microdisplay is through the use of a direct light source, such as a light emitting diode the use of a light emitting diode as an illumination source for a reflective microdisplay is illustrated in FIG. 9. As illustrated in FIG. 9, the display system includes a beamsplitting magnification optic 33, a reflective element 31 and a microdisplay 12. A light emitting diode 52 is embedded in a glass spacer 54, the light emitting diode 52 being arranged to direct light toward the reflective microdisplay 12.

When a beamsplitting magnification optic 33 is employed as both the first and second magnification optic, the beamsplitting magnification optic 33 transmits and reflects a percentage of the light, the precise percentage depending on the optic used. It is preferred that the beamsplitting magnification optic 33 reflect between about 25 and 75 percent of the light, more preferably about 40 and 60 percent of the light.

Figure 10:
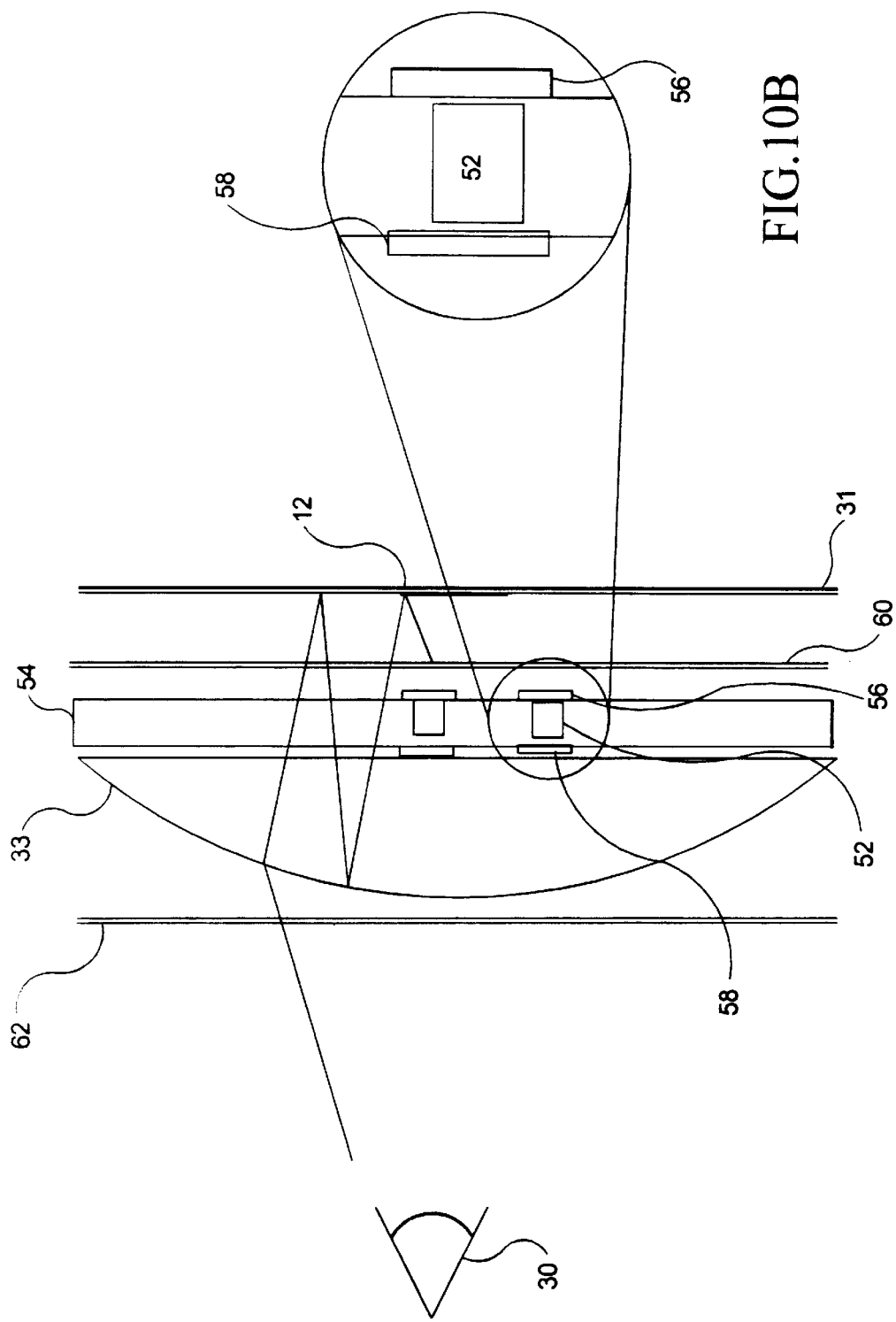

In order to improve the image contrast ratio provided to the observer by the display system, it is preferred that the display system include additional components which reduce the amount of light transmitted through the beamsplitting magnification optic 33 which does not correspond to the compound magnified virtual image. FIGS. 10A–B illustrate one embodiment of the present invention in which a series of quarter wave plates are used in combination with vertical polarizers to improve the contrast ratio of the display system.

The display system illustrated in FIG. 10A includes a beamsplitting magnification optic 33, a reflective optic 31, a microdisplay 12, and a light emitting diode 52 embedded in a glass spacer 54 as illustrated with regard to FIG. 9. As illustrated in more detail in FIG. 10B, the light emitting diode 52 includes a vertical polarizer 56 and an aluminum mirror 58 such that the light emitting diode 52 provides vertically polarized illumination. A quarter waveplate 60 is positioned between the beamsplitting magnification optic 33 and the reflective optic 31. A polarizer 62 is positioned between the beamsplitting magnification optic 33 and the observer 30 which only allows vertically polarized light to pass.

According to this embodiment, the vertical polarizer 56 converts the light emitted from the light emitting diode 52 into vertically polarized light. The light is then passed through a quarter waveplate which converts the light into right or left circularly polarized light. This light is then reflected off of the reflective microdisplay 12 to form a source object 14 which is projected toward the beamsplitting magnification optic 33. Prior to reaching the beamsplitting magnification optic 33 the light corresponding to the source object 14 passes through the quarter waveplate 60 again which converts the light into horizontally polarized light. Once past the quarter waveplate 60, light corresponding to the source object 14 reaches the beamsplitting magnification optic 33 where a portion of the light is reflected back toward the reflective element 31 as the magnified virtual image 20 of the source object 14. A second portion of the light traverses the beamsplitting magnification optic 33 and reaches the polarizer 62. The light traversing the beamsplitting magnification optic 33 and thus is not able to traverse the polarizer 62 and reach the observer 30.

The portion of the light reflected off the beamsplitting magnification optic 33 toward the reflective element 31 as the magnified virtual image 20 traverses the quarter waveplate 60 which converts the light into right or left circularly polarized light. Once past the quarter waveplate 60, the light reflected off the reflective element 31 where it again traverses the quarter waveplate 60, the quarter waveplate 60 converting right or left circularly polarized light into vertically polarized light.

Once past the quarter waveplate 60, the vertically polarized light corresponding to the magnified virtual image 20 reaches the beamsplitting magnification optic 33 where a portion of the light is reflected back toward the reflective element 31. A second portion of the light is magnified as it traverses the beamsplitting magnification optic 33 and forms a compound magnified virtual image 20 of the source object 14. The light traversing the beamsplitting magnification optic 33 is vertically polarized light and is thus able to traverse the polarizer 62 and reach the observer 30 as the compound magnified virtual image 20.

Figure 13:
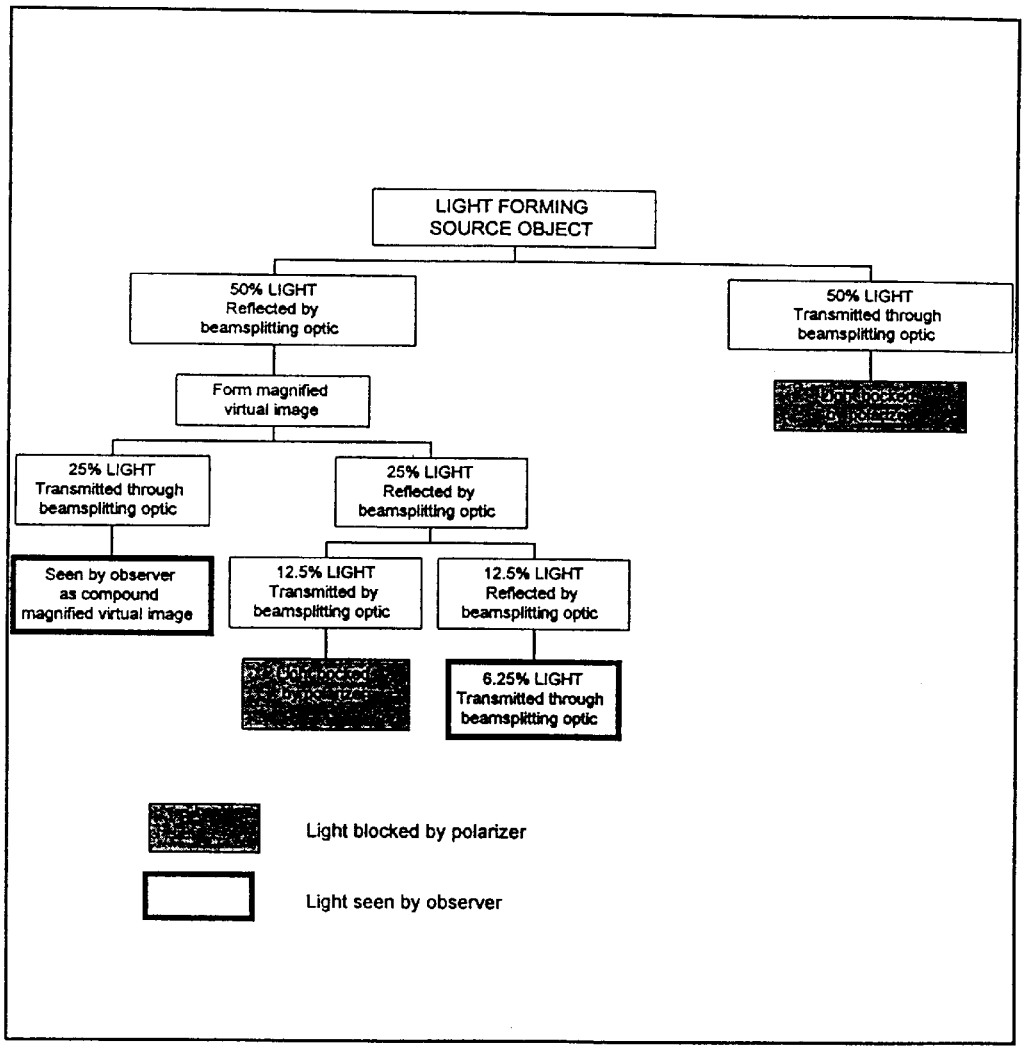
FIG. 13 illustrates what happens to portions of the light corresponding to the source object which are reflected or transmitted by the beamsplitting magnification optic in the display system illustrated in FIGS. 10A–B.

FIG. 13 summarizes what happens to the portions of the light corresponding to the source object 14 which are reflected or transmitted by the beamsplitting magnification optic 33 in the display system illustrated in FIGS. 10A–B.

As illustrated in FIG. 13, 25% of the light forming the source object is conveyed to the observer 30 as the compound magnified virtual image. 6.25% of the light reaches the observer 30 as unfocused light (approximately 1% more of the light also reaches the observer 30 as unfocused light after several additional reflections). The remainder of the light is blocked by the polarizer 62. As a result, the display system as illustrated in FIGS. 10A–D provides a contrast ratio of the compound magnified image to unfocused background light of 4:1. The light transmitted through the beamsplitting magnification optic 33 that does not correspond to the image is not in focus and thus does not interfere with the observer's perception of the compound magnified virtual image 28, except with regard to the contrast ratio.

The electronic display may also include an intermediate image synthesizing optic which provides a synthesized electronic display with enhanced eye relief and a wider field of view than is possible using a traditional compound magnification system. For example, the synthesized electronic display enables the observer to view the display over a 34 degree full angle field of view with at least about a 35 mm eye relief.

In a further, preferred embodiment, the display system includes an eye position sensor system which enables the observer to use his or her eye to interact with a control device. Through this interaction, the eye position sensor system may be used to control the source object produced by the microdisplay. The eye position sensor system may also be used to control a variety of functions performed by the display system, for example, directing a printer to print a document or directing a facsimile machine to send a message. According to this embodiment, the position of the observer's eye is detected and used, much like a cursor, to interact with the controlling device 54 to control the source object 14 produced by the microdisplay 12.

Devices, such as eye trackers and occulometers, for detecting the position of the eye, are well known in the art. For example, suitable devices which may be used in conjunction with the virtual mouse sensor system include the devices described in United Kingdom Patent Application GB 2270171A and U.S. Pat. No. 4,513,317, each of which is incorporated herein by reference.

Figure 11:
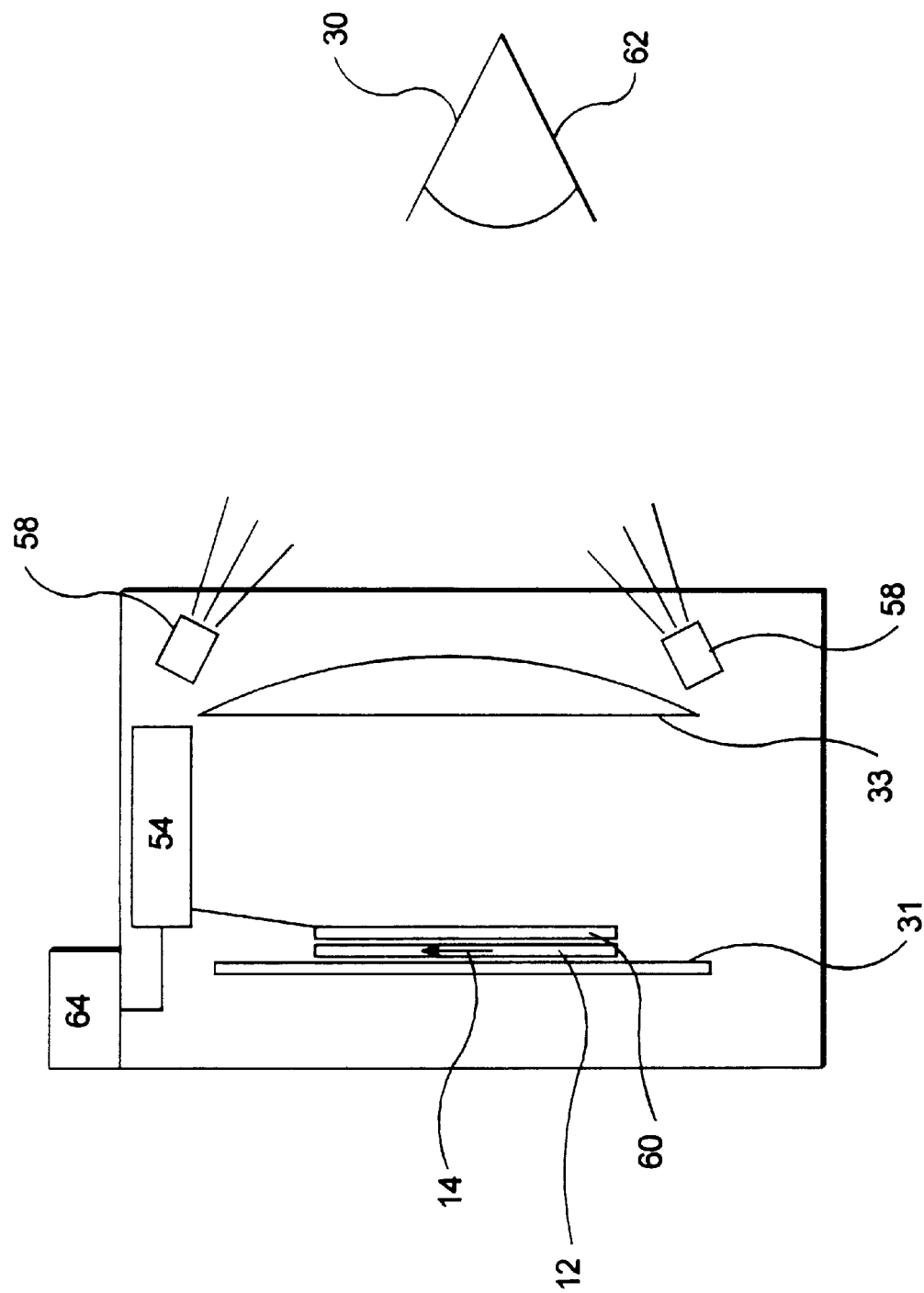
FIG. 11 illustrates an embodiment of the display system which includes an eye position sensor system which enables the observer to use his or her eye to interact with a control device to control the source object produced by the microdisplay and/or functions that the display system performs.

In one embodiment illustrated in FIG. 11, the eye position sensor system 56 includes a light emitting diode (LED) 58 positioned around the perimeter of the beamsplitting magnification optic 33 for providing illumination in the direction of the observer's eye 30. The illumination is preferably in the infrared region. The eye position sensor system 56 also includes a detector array 60 positioned adjacent to the beamsplitting magnification optic 33 for detecting reflections of the illumination from the LED 58 off of the retina 62 of the observer's eye 30, the reflections serving to indicate the position of the observer's eye 30. The eye position sensor system 56 also includes a control mechanism 64 which the observer uses in combination with the detector array 60 to interact with the controlling device 54 to control the source object 14 produced by the microdisplay 12.

The control mechanism 64 may be, for example, a button which the observer 30 depresses to indicate that the observer is looking at a selected item, such as a computer software icon. The control mechanism 64 may also be a timing mechanism which determines that the observer has selected an item based on the amount of time that the observer is looking in a particular direction.

Figure 12:
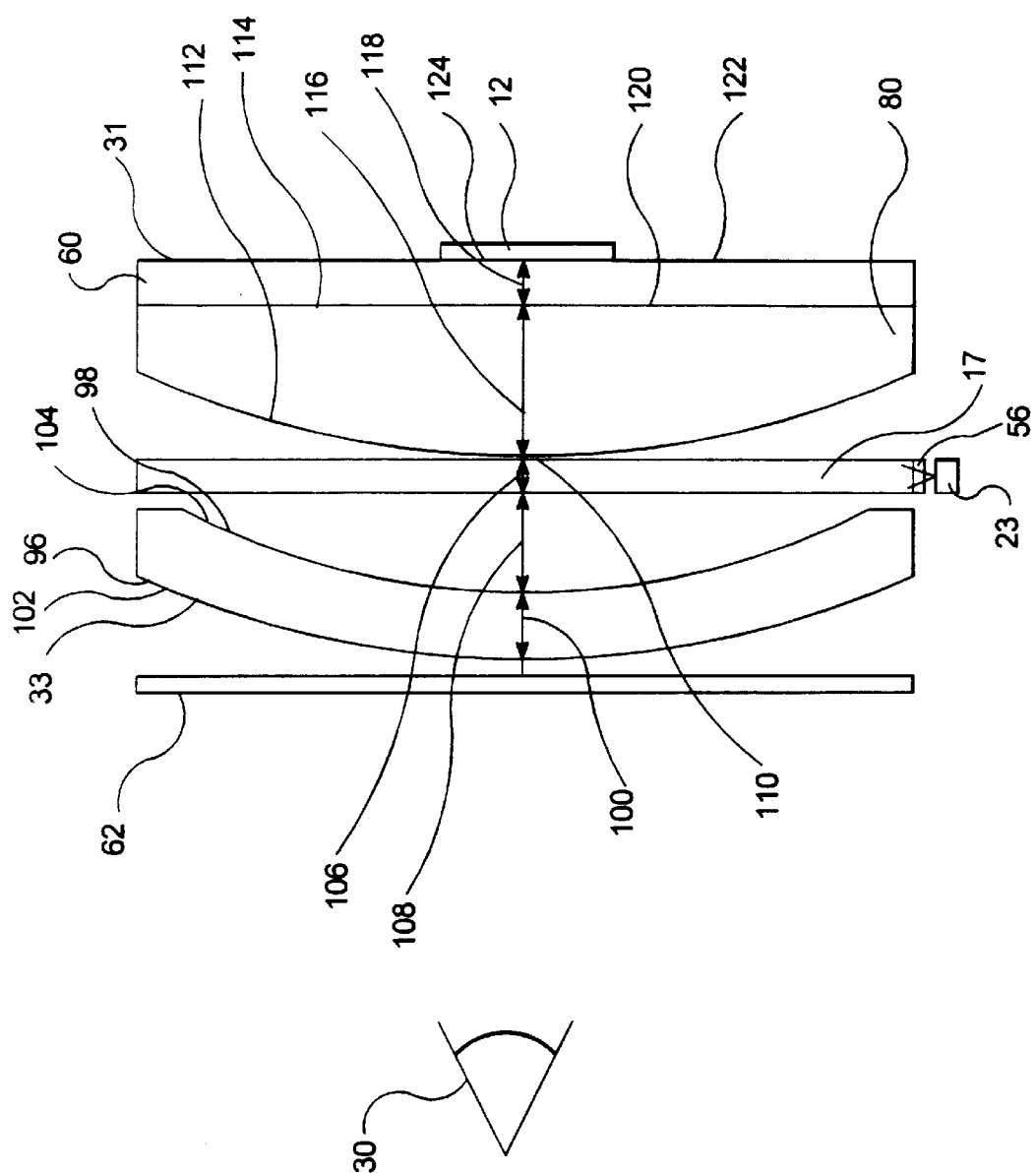
FIG. 12 illustrates a preferred embodiment of the display system of the present invention in which a single beamsplitting magnification optic is employed.

FIG. 12 illustrates a preferred embodiment of the display system of the present invention in which a beamsplitting magnification optic is employed. The virtual image display system illustrated in FIG. 12 includes a beamsplitting magnification optic 33, a lens 80 and a reflective element 31 similar to those elements illustrated in FIG. 4B. Also included in the virtual image display system is a wave guide illumination source 17, a reflective microdisplay 12 and three polarization elements 56, 60 and 62.

The beamsplitting magnification optic 33 is made from glass with an index of refraction of 1.51 such as BK7 or a similar type of glass. The beamsplitting magnification optic 33 has a thickness 100 of 0.08 inches and a diameter of 0.9 inches. A first surface 96 of the beamsplitting magnification optic 33 facing the eye 30 has a radius of curvature equal to 1.15 inches. A second surface 98 of the beamsplitting magnification optic 33 facing away from the eye 30 has a radius of curvature equal to 0.823 inches. A partially reflective beamsplitter coating 102 in the visible wavelength regime is applied to the first surface 96. The second surface 98 includes an anti-reflection coating 104 for visible wavelengths.

The polarization element positioned nearest-the eye 30 is a sheet polarizer 62 such as is available from the Polaroid Corporation.

The wave guide illumination source 17 includes an LED 23 which provides illumination to the reflective microdisplay 12. The output of the LED 23 is polarized by a polarizer 56, thereby illuminating the reflective microdisplay 12 with polarized light. The wave guide illumination source 17 has a thickness 106 of 0.04 inches. The distance 108 between the beamsplitting magnification optic 33 and the wave guide illumination source 17 is 0.1209 inches.

Lens 80 is positioned a distance 110 of 0.005 inches from the wave guide 17. Lens 80 is made from glass with an index of refraction of 1.51 such as BK7 or a similar type of glass. Lens 80 has a first surface 112 facing the eye 30 with a radius of curvature of 1.02 inches and a second flat surface 114. The first surface 112 is anti-reflection coated for visible wavelengths. The second surface 114 is uncoated. Lens 80 has a thickness 116 of 0.210 inches and a diameter of 0.9 inches.

A quarter waveplate 60 in the visible wavelength regime, such as is available from Virgo Optics in Port Richey, Fla., is positioned in contact with lens 80. The quarter waveplate 60 has a thickness 118 of 0.04 inches. The quarter waveplate 60 includes a first surface 120 facing the eye which is uncoated and a second surface 122 facing away from the eye 30 which is coated with aluminum or other suitable reflective material except for a small rectangular region 124 in the center of the waveplate where the reflective microdisplay 12 is positioned. The first uncoated surface 120 of the quarter waveplate 60 is placed in optical contact with lens 80 using a suitable transparent optical cement. The display 12 is placed in contact with the uncoated rectangular region 124 of the quarter waveplate.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A compact virtual image electronic display system comprising:

a microdisplay for producing a source object;

a beamsplitting magnification optic for receiving light corresponding to the source object, and magnifying and reflecting a portion of the light as a magnified virtual image of the source object;

a reflective element positioned to receive and reflect the magnified virtual image back to the beamsplitting magnification optic;

the beamsplitting magnification optic being positioned to receive the reflected magnified virtual image, the refractive and partially reflective surfaces of the beamsplitting magnification optic magnifying and transmitting a portion of the reflected magnified virtual image through the beamsplitting magnification optic as a compound magnified image of the magnified virtual image to an observer; and a distance adjusting mechanism for adjusting a distance between the beamsplitting magnification optic and the reflective element, the magnification of the compound magnified image relative to the source object being dependent on the distance between the beamsplitting magnification optic and the reflective element.

2. The display system according to claim 1 wherein the display system further includes a distance sensing mechanism for sensing the distance between the beamsplitting magnification optic and the reflective element and communicating the distance to a control mechanism which modifies the source object in response.

3. The display system according to claim 1 wherein the display system further includes a control mechanism for causing the distance adjusting mechanism to adjust the distance between the beamsplitting magnification optic and the reflective element in response to the source object produced by the microdisplay.

4. The display system according to claim 1 wherein the display system further includes a user selectable input for modifying the source object.

5. The display system according to claim 4 wherein activation of user selectable input causes the distance adjusting mechanism to adjust the distance between the beamsplitting magnification optic and the reflective element in response to the source object produced by the microdisplay.

6. The display system according to claim 1 wherein the distance between the beamsplitting magnification optic and the reflective element is less than about 15 mm.

7. The display system according to claim 1 wherein the distance between the beamsplitting magnification optic and the reflective element is less than about 7 mm.

8. A compact virtual image electronic display system comprising:

a microdisplay for producing a source object;

a first magnification optic for magnifying the source object and reflecting a magnified virtual image;

a second magnification optic for providing a compound magnified virtual image of the magnified virtual image to an observer; and a distance adjusting mechanism for adjusting the distance between the first and second magnification optics, the magnification of the compound magnified image relative to the source object being dependent on the distance between the first and second magnification optics.

9. The display system according to claim 8 wherein the display system further includes a distance sensing mechanism for sensing the distance between the first and second magnification optics and communicating the distance to a control mechanism which modifies the source object in response.

10. The display system according to claim 8 wherein the display system further includes a control mechanism for causing the distance adjusting mechanism to adjust the distance between the first and second magnification optics in response to the source object produced by the microdisplay.

11. The display system according to claim 8 wherein the display system further includes a user selectable input for modifying the source object.

12. The display system according to claim 11 wherein activation of user selectable input causes the distance adjusting mechanism to adjust the distance between the first and second magnification optics in response to the source object produced by the microdisplay.

13. A method for modifying a magnification of a compound magnified virtual image comprising:

producing a source object;

directing the source object to a beamsplitting magnification optic which receives light corresponding to the source object, and magnifies and reflects a portion of light forming the source object as a magnified virtual image of the source object, directing the magnified virtual image to a reflective element which reflects the magnified virtual image back to the beamsplitting magnification optic which magnifies and transmits a portion of the reflected magnified virtual image through the beamsplitting magnification optic as a compound magnified image of the magnified virtual image to an observer; and modifying a distance between the beamsplitting magnification optic and the reflective element, the magnification of the compound magnified image relative to the source object being dependent on the distance between the beamsplitting magnification optic and the reflective element.

14. The method according to claim 13, wherein the step of modifying the distance between the beamsplitting magnification optic and the reflective element is made in response to a change in the source object.

15. The method according to claim 13, further including modifying the source object in response to a change in the distance between the beamsplitting magnification optic and the reflective element.

16. The display system according to claim 13 wherein the distance between the beamsplitting magnification optic and the reflective element is less than about 15 mm.

17. The display system according to claim 13 wherein the distance between the beamsplitting magnification optic and the reflective element is less than about 7 mm.

18. A method for modifying a magnification of a compound magnified virtual image comprising:

producing a source object;

directing the source object to a first magnification optic which magnifies and reflects the source object to produce a magnified virtual image;

directing the magnified virtual image to a second magnification optic which magnifies the magnified virtual image to produce a compound magnified image of the magnified virtual image to an observer; and modifying a distance between the first and second magnification optics, the magnification of the compound magnified image relative to the source object being dependent on the distance between the first and second magnification optics.

19. The method according to claim 18, wherein the step of modifying the distance between the first and second magnification optics is made in response to a change in the source object.

20. The method according to claim 18, further including modifying the source object in response to a change in the distance between the first and second magnification optics.

* * * * *